United States Patent [19]

Smith

[11] 4,196,396
[45] Apr. 1, 1980

[54] INTERFEROMETER APPARATUS USING ELECTRO-OPTIC MATERIAL WITH FEEDBACK

[75] Inventor: Peter W. Smith, Colts Neck, N.J.

[73] Assignee: Bell Telephone Laboratories, Incorporated, Murray Hill, N.J.

[21] Appl. No.: 902,733

[22] Filed: May 3, 1978

Related U.S. Application Data

[63] Continuation-in-part of Ser. No. 732,755, Oct. 15, 1976, abandoned.

[51] Int. Cl.² ............................................. H01S 3/10
[52] U.S. Cl. ................................... 330/4.3; 332/7.51; 356/352
[58] Field of Search ..................... 332/7.51; 356/106 S, 356/112; 331/94.5 C; 330/4.3, 4.5

[56] References Cited

U.S. PATENT DOCUMENTS

| | | | |
|---|---|---|---|
| 3,243,722 | 3/1966 | Billings | 331/94.5 S |
| 3,328,723 | 6/1967 | Giordmaine et al. | 332/7.51 |
| 3,567,325 | 3/1971 | Tibbals | 356/112 |
| 3,579,145 | 5/1971 | DeLange | 332/7.51 |
| 3,612,655 | 10/1971 | Buchan et al. | 356/112 |

FOREIGN PATENT DOCUMENTS 381054 5/1973 U.S.S.R. .................................. 332/7.51

OTHER PUBLICATIONS

Kastalskii, 'Optical and Electrical Effects . . . Resonator', 11/73, pp. 635–638, Sov. Phys. Semicond., vol. 7, #5.

Smith et al., "A Bistable Fabry-Perot Resonator", 3/15/77, pp. 280–281, Appl. Phys. Lett., vol. 30, #6.
Smith et al., "Nonlinear Electro–Optic . . . Feedback", 3/78, pp. 55–57, Optics Lett., vol. 2, #3.
Feldman, "Bistable Optical . . . Cell", 4/79, pp. 115–117, Optics Lett., vol. 4, #4.
Felber et al., "Theory of Nonresonant Multistable Optical Devices", 6/15/76, pp. 731–733, Appl. Phys. Lett., vol. 28, #12.

Primary Examiner—Nelson Moskowitz
Attorney, Agent, or Firm—Daniel D. Dubosky

[57] ABSTRACT

A nonlinear interferometer apparatus is disclosed wherein a Fabry-Perot cavity is substantially filled with an electro-optic material having terminals to which a potential can be applied. A single frequency, single mode, linearly polarized source of optical radiation is coupled into the cavity and a beam splitter at the output of the cavity deflects a portion of the optical energy coming from the cavity. This deflected portion of output optical energy is incident on a photodetector whose output is amplified and connected to the terminals of the electro-optic material. The resulting device exhibits differential gain, and can function as an optical switch, limiter or optical memory element. With sufficient amplification of the detector output, an optical quantizer is provided. By properly adjusting the cavity length and providing a substantially constant optical signal to the input end of the cavity, an amplified replica of an amplitude modulated optical signal applied to the photodetector appears at the output end of the cavity.

7 Claims, 8 Drawing Figures

FIG. I

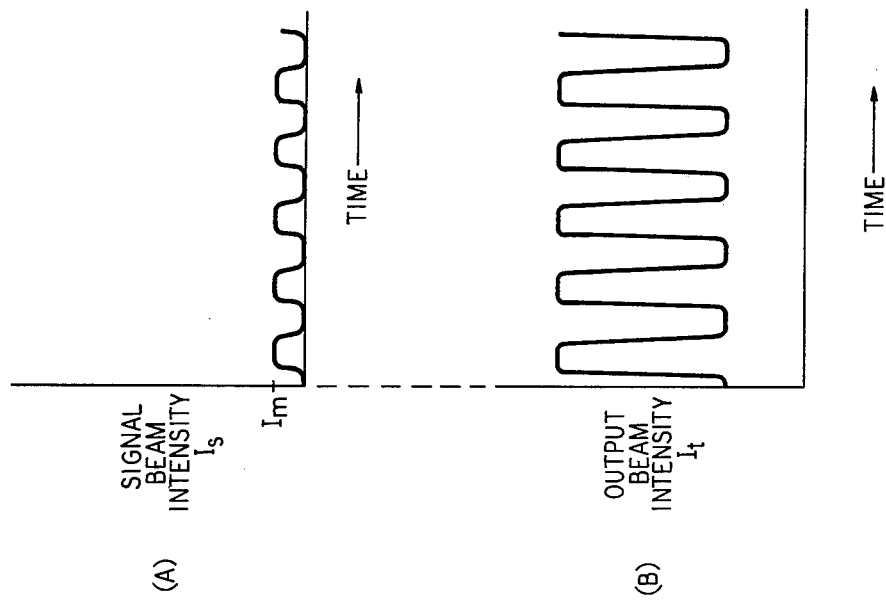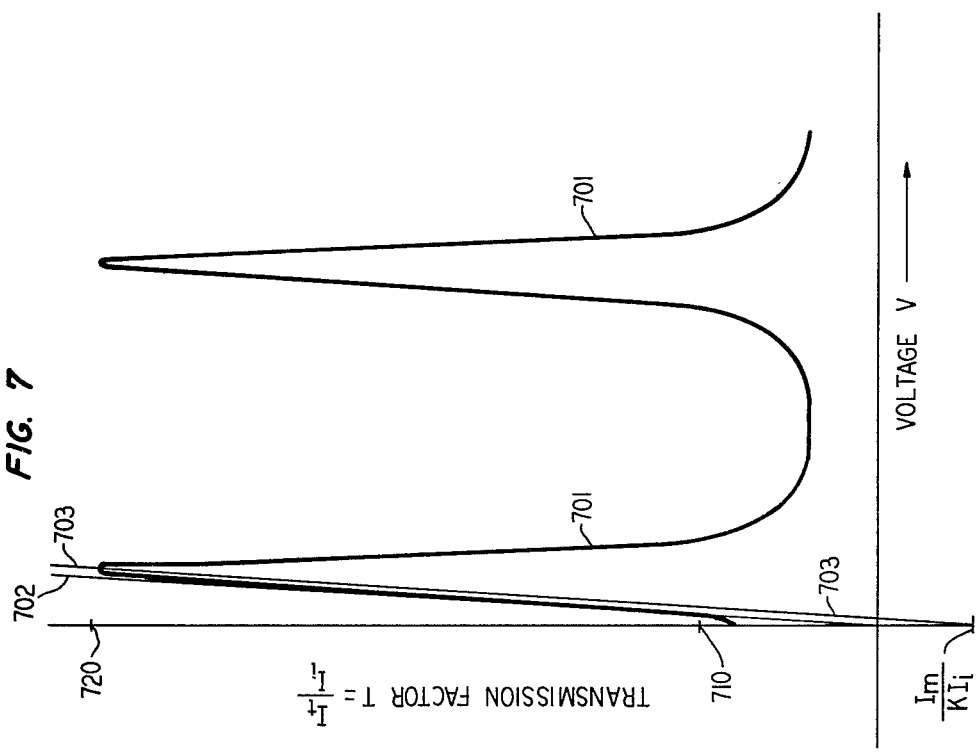

INTERFEROMETER APPARATUS USING ELECTRO-OPTIC MATERIAL WITH FEEDBACK

CROSS-REFERENCE TO RELATED APPLICATION

This is a continuation-in-part of a prior copending application, Ser. No. 732,755, filed on Oct. 15, 1976, now abandoned.

BACKGROUND OF THE INVENTION

This invention relates to a nonlinear interferometer device and more particularly to a nonlinear device wherein the interferometer cavity contains a material whose index of refraction is a function of the optical energy within the cavity.

The prior art has produced a nonlinear interferometer device wherein the interferometer cavity is substantially filled with a Kerr medium, see the article entitled "Theory of Nonresonant Multistable Optical Devices", by F. H. Felber and J. H. Marburger, *Applied Physics Letters*, Vol. 28, No. 12, June 15, 1976, pages 731–733. This type of device was suggested by Felber et al in order to provide a bistable interferometer which is not dependent on the resonant or absorption properties of the medium as in still other prior art interferometer devices. In a Kerr medium the index of refraction is a function of the time averaged optical energy density within the medium. As taught by Felber et al, this type of interferometer device with a Kerr medium, in theory at least, provides a bistable device which exhibits differential gain, and may be utilized as a memory element, a power limiter or optical switch providing the device is suitably biased. Since the effect utilized does not depend on any resonant properties of the medium, the device may be biased by an independent field whose frequency differs from that of the field being amplified. Unfortunately, the Felber et al device which uses a Kerr medium requires power densities of the order of $10^8$ watts/cm$^2$ in order to exhibit the bistable characteristics. This high power is required for all known mediums since the dependence of the refractive index on the energy density is a very low magnitude affect.

SUMMARY OF THE INVENTION

In accordance with the present invention an interferometer cavity is substantially filled with an electro-optic material having terminals to which a potential can be applied. Since the index of refraction of this electro-optic material is dependent on this potential, the cavity can be tuned by changing the magnitude of the potential applied to the electro-optic medium. A photodetector is caused to be responsive to the energy density of the optical radiation within the cavity and the potential developed by this photodetector is coupled to the terminals of the electro-optic medium. The resulting device exhibits external characteristics that are identical to those predicted for the Felber et al device, but it does so when using optical radiation that can be many orders of magnitude lower than that required when using a Kerr medium.

In the specific embodiment shown, a beam splitter is utilized to sample the optical energy at the output of the cavity and this optical energy is coupled to a photodetector whose output is amplified before being coupled to the electro-optic material. If sufficient amplification is provided, the resulting device will function as an optical quantizer providing discrete equally spaced levels of light output for a full range of input light levels. As pointed out in the specification, however, integrated optics versions of this apparatus need not require the beam splitter or the external amplification.

In still another embodiment a substantially constant amplitude and constant wavelength optical signal is applied to the input end of the interferometer cavity. The amplitude of this optical signal and the cavity length are selected such that the optical signal at the output end of the cavity is at a relatively low value and such that a small increase in voltage at the terminals of the electro-optic medium will result in an increase in the amplitude of the output optical signal substantially to its maximum value. Under these preselected conditions application of an amplitude modulated optical input signal to the photodetector results in the production of an amplified replica of this input signal at the output end of the cavity.

BRIEF DESCRIPTION OF THE DRAWING

The invention will be more readily understood after reading the following detailed description in conjunction with the drawings wherein:

FIG. 7 is a graph of transmission factor versus feedback voltage useful in explaining the operation of the apparatus shown in FIG. 6; and FIG. 8 is a plot of input and output signal waveforms obtained in apparatus of the type shown in FIG. 6.

DETAILED DESCRIPTION

Figure 1:
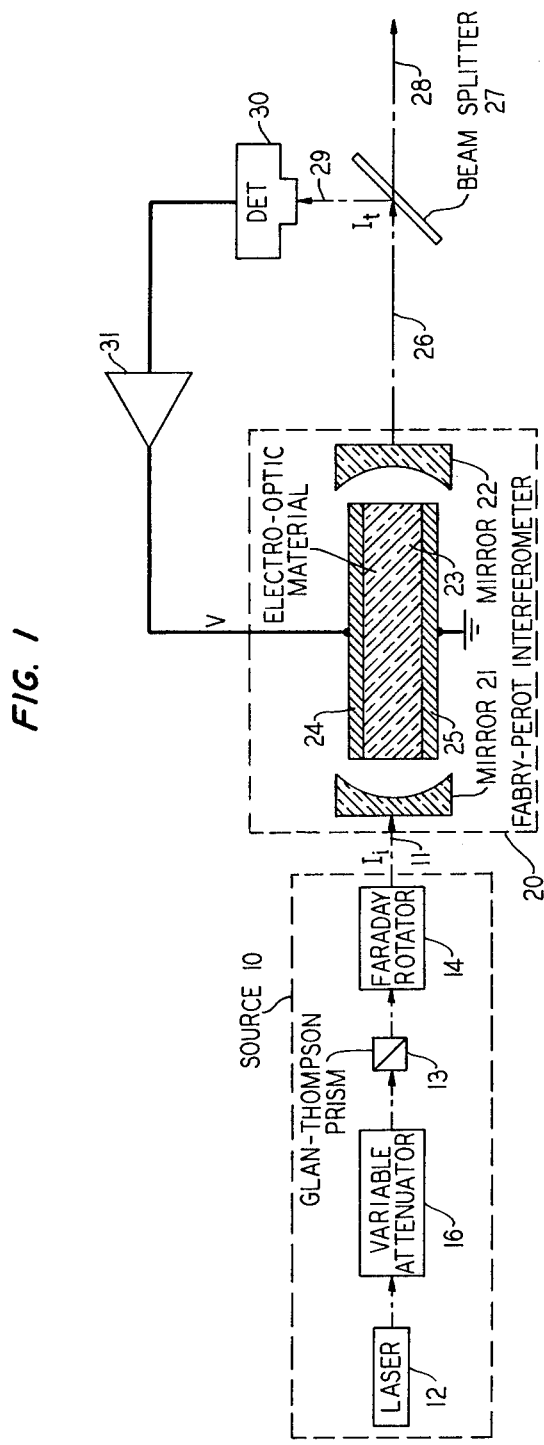
FIG. 1 is a schematic block diagram of an apparatus constructed in accordance with the present invention.

In FIG. 1 source 10 provides a single frequency, single mode of linearly polarized optical radiation on a path 11 to the input of a Fabry-Perot interferometer 20. Source 10 can consist of any one of a wide variety of optical radition sources that have suitable isolation from the effects of energy reflected from the Fabry-Perot interferometer 20. One grouping of elements that can be utilized to provide this optical radiation on path 11 is shown in FIG. 1 as source 10 wherein a HeNe laser having an output of 6328 Å has its output coupled to the input of a variable attenuator 16. The variable attenuator 16 allows the power of the optical radiation incident on the Fabry-Perot interferometer 20 to be continuously varied. Radiation from the variable attenuator 16 is coupled to a Glan-Thompson prism which permits only a single polarization of the optical radiation from laser 12 to pass to the input of a Faraday rotator 14. The output of the Faraday rotator provides the linearly polarized, single mode of radiation on path 11 and in addition prevents any reflected radiation from influencing the operation of laser 12.

The optical energy on path 11 is coupled to the input of a Fabry-Perot cavity consisting of mirrors 21 and 22. In the specific embodiment constructed, each of the mirrors 21 and 22 is 10 centimeters in diameter and they are spaced at a distance of approximately 10 centimeters. The mirrors each have a reflectivity of 80 percent at 6328 Å and the finesse of the resonator was approximately equal to seven. The Fabry-Perot cavity provided by mirrors 21 and 22 is substantially filled with an electro-optic medium 23 having terminals 24 and 25 on face of said medium to which a potential can be applied to change the refractive index of the electro-optic material. The electro-optic medium utilized in the embodiment consisted of a block of potassium-dihydrogen phosphate (KDP) but any other electro-optic material such as lithium niobate (LiNbO$_3$) can be utilized. A potential of 1200 volts applied to terminals 24 and 25 was sufficient to change the phase of the light passing through the modulator by $\pi$ radians.

The optical energy emanating from the Fabry-Perot cavity on path 26 is coupled to a beam splitter 27 through which much of the energy passes on a path 28. The energy reflected by beam splitter 27 is coupled via a path 29 to the input of a photodetector 30. In the embodiment constructed, photodetector 30 was implemented by using a solar cell having sensitivities corresponding to the wavelength of radiation provided by laser 12. The output of photodetector 30 is coupled by way of amplifier 31 to the terminals 24 and 25 of the electro-optic medium 23. In the embodiment constructed, amplifier 31 provided an output of approximately 1000 V for a power of 1µ watt incident on the detector. As will be apparent from the discussion hereinafter, the amount of output required is dependent on the electro-optic medium utilized and on the sensitivity of the photodetector.

The electro-optic medium 23 provides an index of refraction n that can be represented by the following equation:

$$n = n_o + n_2(V) \tag{1}$$

where $n_o$ is the index of refraction provided when zero potential is connected to terminals 24 and 25, and $n_2$ is the index of refraction that is contributed by virtue of the fact that a potential is coupled to the terminals of the electro-optic material. By comparing equation 1 above with equation 1 in the Felber et al article, it can be seen that the index of refraction provided by the electro-optic material can have an identical effect to that which is provided by a Kerr medium if the voltage provided to the terminals of the medium is caused to be a function of the optical energy density within the cavity. If this voltage is a function of the output optical energy density from the cavity, it will also be a function of the optical energy density within the cavity since these two energy densities are related by the transmittence of output mirror 22 in the Fabry-Perot cavity.

Since the output optical intensity is a function of the voltage provided to the electro-optic medium and furthermore since this voltage is a function of the output optical intensity, the operation of this Fabry-Perot apparatus can most easily be explained through use of a graphical solution of much the same type provided by Felber et al in the above-identified article.

Figure 2:
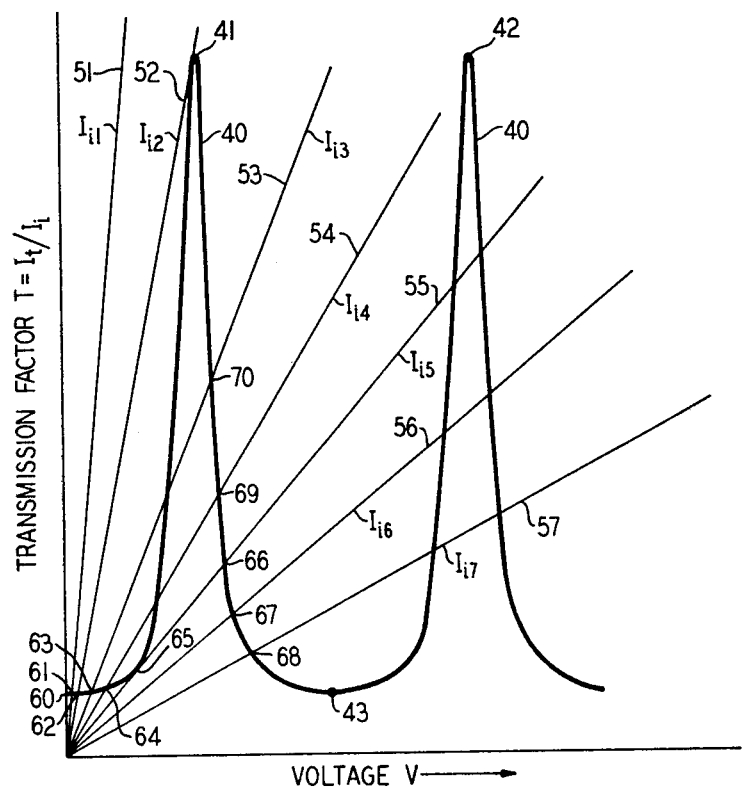
FIG. 2 is a graph of transmission factor versus feedback voltage useful in describing the operation of the present invention.

In FIG. 2 curve 40 is a plot of the transmission factor T developed by the Fabry-Perot cavity for values of voltage V provided to terminals 24 and 25 of the electro-optic medium. The transmission factor T is simply the ratio of the transmitted optical intensity $I_t$ to the incident optical intensity $I_i$. This characteristic exhibited by curve 40 is identical to the characteristic which can be obtained by tuning the Fabry-Perot cavity in a way which would involve changing the spacing by the mirrors 21 and 22. In the present characteristic, however, this spacing remains constant and the tuning takes place by changing the potential applied to the terminals of the electro-optic medium which in turn changes the refractive index presented by the electro-optic medium within the cavity. At specific voltages on terminals 24 and 25 resonance of the cavity is achieved and the multiple reflections of optical energy within the cavity constructively interfere thereby causing most of the incident energy to be coupled to the output of the cavity. These points of resonance are illustrated at points 41 and 42 on curve 40 in FIG. 2. For other values of voltage the transmission factor of the cavity is changed, and at some points the optical energy within the cavity is in destructive interference. At these points very little of the incident energy is coupled to the output of the cavity. One such point of destructive interference is designated as point 43 on curve 40 in FIG. 2. To achieve an optimum bistable characteristic the spacing of mirrors 21 and 22 is adjusted such that the cavity is at a point of low transmission when zero potential is applied to the terminals of the electro-optic medium.

Also shown on FIG. 2 is a family of curves which represents the relationship between the output optical intensity, $I_t$, and the voltage developed at the output of amplifier 31. These curves are designated by the numerals 51–57 in FIG. 2. Each of these curves 51–57 provides the relationship between the output optical intensity $I_t$ and the voltage at the output of amplifier 31 for a particular value of input optical intensity $I_i$. A family of curves is necessary since the axis of ordinates in FIG. 2 represents the ratio of intensities rather than simply the output optical intensity. The intersection of curves 51–57 with curve 40 provides the points at which the apparatus of FIG. 1 will operate when the feedback loop is closed.

Although there are a discrete number of curves shown in FIG. 2 for the relation between output optical intensity and voltage at the output of amplifier 31, these curves can also be thought of as a single curve which sweeps through the field provided by the axis, the particular slope for the curve being dependent on the value of the incident optical energy $I_i$. As the intensity of the incident energy is increased, this sweeping curve achieves a lower slope in the field represented by the axis in FIG. 2. Hence, for the curves shown in FIG. 2, the axis of ordinates is the position of the sweeping curve for which the incident optical energy is equal to zero. At increasing intensities of incident radiation the curve sweeps through the positions corresponding to curves 51–57 achieving lower and lower slope as the intensity of the incident energy increases.

As the incident energy is increased from zero, the apparatus of FIG. 1 achieves operating points represented by the intersections 60–65. Throughout these operating points the transmission factor T remains at a very low value and much of the input power is not coupled to the output. For any further increase in input optical energy past point 65, the operating point must jump to a point corresponding to intersection 66 in FIG. 2. Hence, at this value of incident energy designated as $I_{i5}$ in FIG. 2, a sudden increase in the transmission factor T is encountered, and therefore a much larger percentage of the incident energy suddenly appears at the output. For any further increases in the incident energy corresponding, for example, to the intersections 67 and 68 in FIG. 2 the output power remains substantially constant since the transmission factor decreases with increasing incident energy. If the incident energy is now decreased through intersections 67 and 66 the Fabry-Perot cavity is now in resonance and the energy required to maintain it in this condition is no longer as great as the energy required to establish the resonant condition. Accordingly, with decreasing incident energy the Fabry-Perot cavity operates at points corresponding to 69 and 70 with an increasing transmission factor thereby providing higher values of output optical energy than were provided for the same incident energy during the initial operation corresponding to points 64 and 63, respectively. This higher level of optical energy output will continue to be maintained with decreasing incident energy up to the resonant point corresponding to point 41 in FIG. 2. At this point any further decrease in incident energy causes the Fabry-Perot cavity to drop to an operating point corresponding to intersection 62 thereby resulting in a sudden decrease in the output optical energy for very little change in the incident energy.

Figure 3:
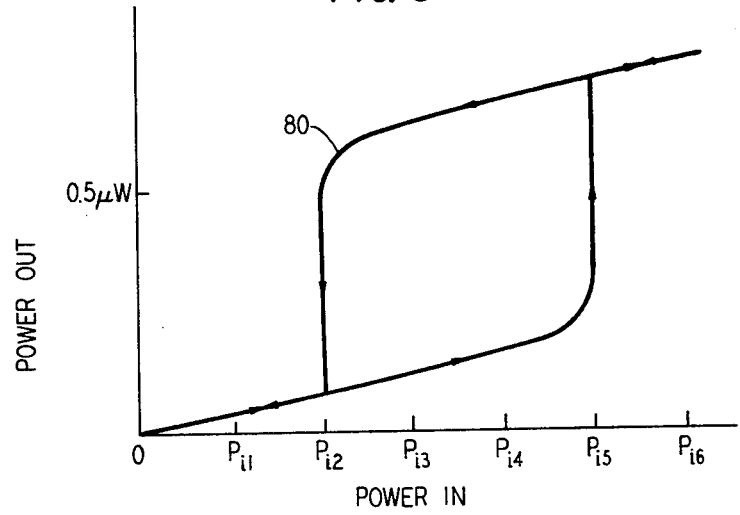
FIG. 3 is a plot of the bistable characteristic obtained from an apparatus constructed in accordance with the present invention.

A graph of power out versus power in for this interferometer apparatus is plotted in FIG. 3 of the drawings. The points designated on the axis of the abscissa by the specific values of $P_{i1}$ through $P_{i6}$ corresponds to the identically numbered values of incident intensity of optical radiation corresponding to curves 51–56, respectively. As shown in FIG. 3, increasing values of input optical power will result in a relatively low output power up to the value designated as $P_{i5}$ in FIG. 3. This corresponds to an incident input intensity designated as $I_{i5}$ in FIG. 2. At this point the output power is suddenly increased for a small change in input power, and any further increase in input power results in very little change in output power. After this change has been encountered any decrease in the input power will maintain the output power at a much higher level than for corresponding input powers that were initially applied. At a power of $P_{i2}$ (corresponding to the incident intensity of $I_{i2}$ in FIG. 2) any further decrease in input power results in a sudden decrease in output power as shown in FIG. 3.

The scales used in the graph of FIG. 3 for the axis of ordinates and axis of abscissas are not identical. Each unit on the axis of abscissas corresponds to a larger change in power than a similar length unit on the axis of ordinates. If the axes had identical scales, point 80 in FIG. 3, corresponding to the point at which resonance occurs in the Fabry-Perot cavity, would be very close to an intersection with a line drawn at a 45° angle from the origin. As indicated in FIG. 3 the interferometer apparatus constructed in accordance with the present invention operates with output optical powers in the order of 0.5 microwatts. This is a considerable improvement over the prior art device which suggests using a Kerr medium wherein energy densities in the order of $10^8$ watts/cm are required.

Figure 4:
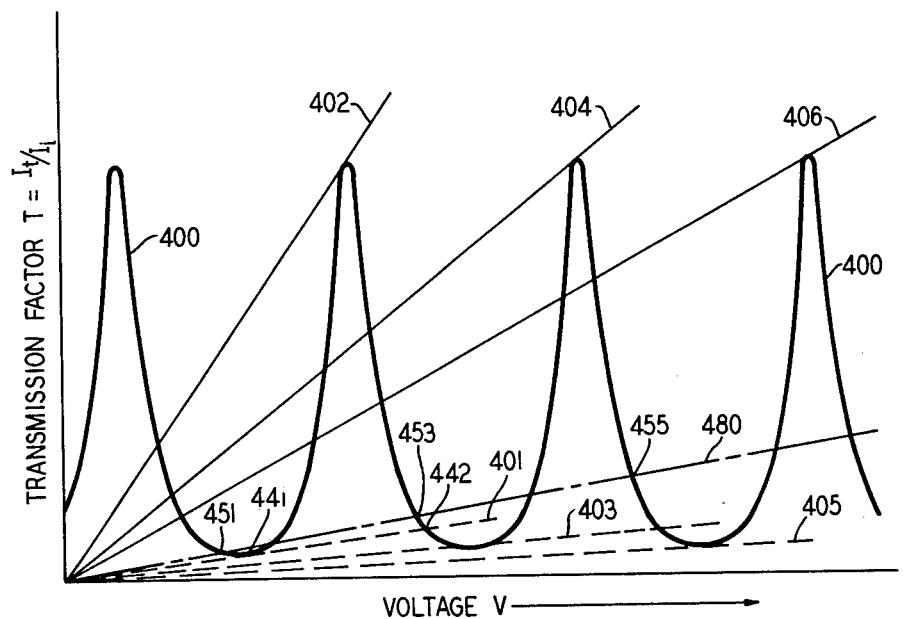
FIG. 4 is a graph of transmission factor versus feedback voltage useful in describing the operation of the present invention as an optical quantizer.

By increasing the incident power $I_i$, or by increasing the gain of amplifier 31 in the feedback path, that is, by increasing the phase shift for a given power incident on the detector, the apparatus of FIG. 1 can be caused to provide a very different behavior from that which was previously described. In the embodiment constructed, amplifier 31 was increased in gain such that voltages as high as 2000 volts were applied to the modulator electrodes. When amplifier 31 has a gain that can provide a voltage of this magnitude to the electrodes, a highly nonlinear behavior can be obtained from the apparatus. This behavior is illustrated in FIG. 4, which, like the plot in FIG. 2, provides a graphical solution to the operation of the apparatus. As in FIG. 2, the operating point in FIG. 4 is determined by the intersection of a feedback circuit load line representing the voltage, V, versus transmitted power, $I_t$, for different values of incident power, $I_i$, with the curve 400 representing transmission factor of the interferometer cavity versus voltage.

Figure 5:
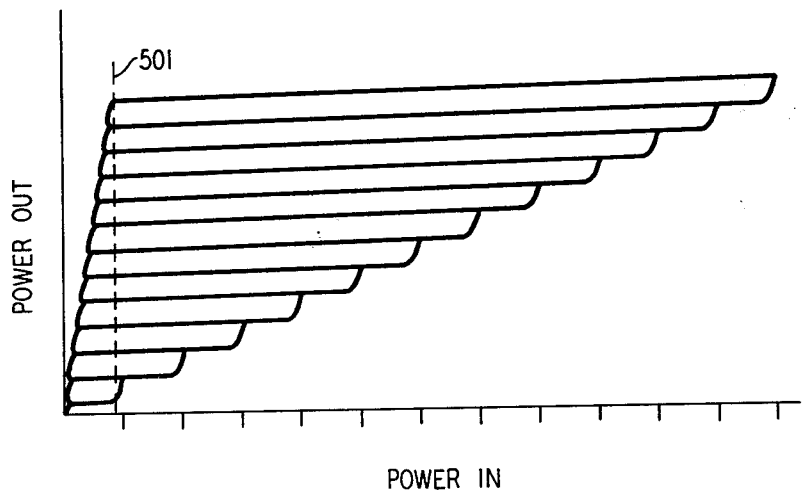
FIG. 5 is a plot of the power out versus power in characteristic obtained when operating as an optical quantizer.

With the cavity adjusted as shown in FIG. 4, increased input power $I_i$ into the cavity causes a rapid increase to a constant level up to a value represented by an intersection of curve 400 with curve 401 at point 441. At this point, the output power encounters a sudden increase in magnitude for any increase in $I_i$ represented by the jump of the operating point to the intersection of curve 401 with curve 400 at point 442. Subsequent increases in input power cause subsequent jumps represented by the intersection of dotted curves 403 and 405 with curve 400. In summary, increasing the input light intensity $I_i$ causes switching to higher transmissivities at the powers indicated by the intersection of dashed lines 401, 403 and 405 with curve 400. When the incident light level is decreased, switching takes place at the light levels represented by the intersection of solid lines 402, 404 and 406 with curve 400. With this type of high gain behavior an output characteristic of the type shown in FIG. 5 is obtained. For this figure, the gain was adjusted to provide approximately $13\pi$ radius of phase shift for the maximum light intensity in beam 11.

As indicated in FIG. 5, there are discrete input power levels at which the output power jumps to a higher value. For all power levels between these discrete levels the output power level is relatively constant. If the apparatus is operated with a residual incident power level indicated by dashed line 501 in FIG. 5, the apparatus can be caused to function as an optical quantizer. This residual level of input power represented by line 501 corresponds to establishing an operating characteristic represented by line 480 in FIG. 4. Initial application of this residual input optical power causes an increase in output power to a level corresponding to the intersection of curve 480 with curve 400 at point 451. As the input power is then raised to a level which is in excess of the input power corresponding to curve 401, but not in excess of the power corresponding to curve 403, a return to the residual power represented by line 501 will cause the apparatus to operate at the point designated as 453 in FIG. 4. Since point 453 has a higher transmission factor than point 451 and the input power $I_i$ is the same, the output power is at a higher level even though residual power is returned to the input. The level of output power will be the same for all values of input power between those corresponding to curves 401 and 403. Similarly, input power levels between those corresponding to curves 403 and 405 will raise the output power level to one corresponding to point 455.

A decrease of the input power to zero, of course, will return the apparatus to its initial operating point at point 451 when the residual input power is again applied at the input. As will be apparent to those skilled in the art, this apparatus can be readily utilized as an optical quantizer giving a discrete level of output power for each one of a plurality of ranges of input optical power as indicated in FIG. 5.

Figure 6:
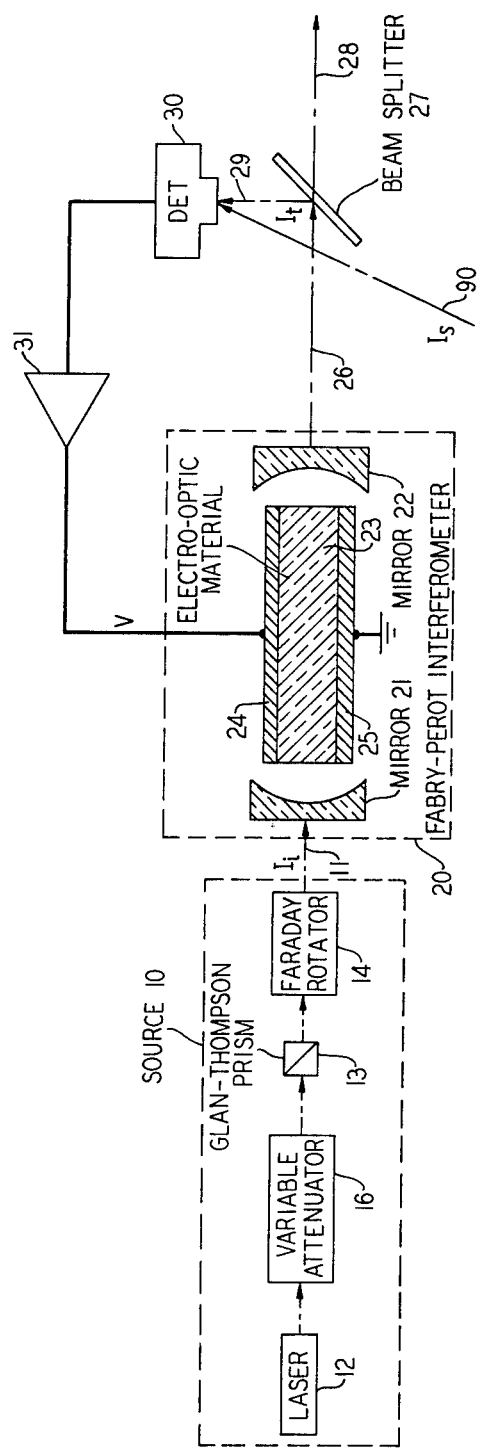
FIG. 6 is a schematic block diagram of an apparatus constructed in accordance with the present invention.

The apparatus disclosed in FIG. 1 can also be utilized to provide an amplified replica of an input amplitude modulated optical signal. To provide this characteristic the cavity length and input power provided by source 10 are adjusted to preselected values and the signal to be amplified is coupled to the photosensitive surface of detector 30 as indicated in FIG. 6. In the apparatus of FIG. 6, the voltage that is applied to the terminals 24 and 25 of the electro-optic material 23 can be represented by the following equation:

$$V = G(KI_t + I_s) \quad (2)$$

where G is the product of the gain of amplifier 31 and the sensitivity of detector 30, $I_t$ is the intensity of of the radiation in output beam 26, k is an attenuation factor introduced by beam splitter 27, and $I_s$ is the intensity of the signal beam 90. This equation can be rearranged by introducing the intensity, $I_i$, of the input beam 11 to provide an equation of voltage versus transmission factor $I_t/I_i$:

$$V = GI_i \left( \frac{KI_t}{I_i} + \frac{I_s}{I_i} \right). \quad (3)$$

Rearranging the equation again, we obtain the following expression for the transmission factor in terms of the voltage, gain, input intensity, and signal intensity:

$$\frac{I_t}{I_i} = \frac{V}{KGI_i} - \frac{I_s}{KI_i} \quad (4)$$

If $I_s$ equals zero, equation (3) simply reduces to an equation which represents the straight line curves 51–57 in FIG. 2. As the input signal intensity $I_i$ increases, the slope of the curve of transmission factor versus voltage decreases. As indicated by equation (4) the introduction of a signal intensity $I_s$ at the photosensitive surface of detector 30 simply introduces a Y-axis intercept whose value depends on the magnitude of $I_s$.

With the interferometer cavity adjusted such that a very low transmission factor is provided with zero voltage, but a small increase in voltage will provide a large increase in the transmission factor, the transmission factor versus voltage characteristic for the interferometer cavity 20 is as shown by curve 701 in FIG. 7. The intensity of the optical signal from source 10, $I_i$, is adjusted such that with no signal present on beam 90, a transmission factor of 710 is provided. A characteristic curve representing a signal intensity $I_s$ of zero is represented by curve 702 in FIG. 7. If the signal intensity $I_s$ on beam 90 is increased to some maximum value $I_m$, the Y-axis intercept of curve 702 is shifted so as to provide a new characteristic curve of the feedback loop represented by curve 703. This causes an abrupt change in the transmission factor to the value 720 in FIG. 7. The gain or amplification of the apparatus, A, can be represented by the following equation:

$$A = \frac{(1-K)I_{t720} - (1-K)I_{t710}}{(I_m - 0)} \quad (5)$$

$$A = \frac{(1-K)}{K} \frac{(I_{t720}/I_i) - (I_{t710}/I_i)}{(I_m/KI_i)} \quad (6)$$

Equation (6) provides a graphical solution to the apparatus gain. Since the value of the intensity $I_i$ of beam 11 is constant, (1-K/K) times the change in transmission factor from 710 to 720 in FIG. 7 divided by the change in the Y-axis intercept represents the gain of the apparatus.

The performance of this circuit is represented by the waveforms illustrated in FIG. 8. Waveform A of FIG. 8 represents the amplitude of the signal beam intensity $I_s$ versus time. Waveform B of FIG. 8 represents the output beam intensity $I_t$ versus time. As indicated in FIG. 8, a gain of approximately 6 is achieved in the apparatus of FIG. 6.

What has been described hereinabove is a specific illustrative embodiment of the present invention. Numerous departures may be made by those skilled in the art without departing from the spirit and scope of the present invention. For example, the entire apparatus may be constructed in integrated optics form wherein the entire apparatus is constructed on a single substrate. The Fabry-Perot cavity with the electro-optic medium can be implemented by using a titanium diffused lithium niobate strip guide on a lithium niobate ($LiNbO_3$) crystal of the type illustrated in the article entitled "Efficient Strip-Waveguide Modulator" by I. P. Kaminow and L. W. Stulz, *Applied Physics Letters*, Vol. 27, No. 10, Nov. 15, 1975, pages 555–557. The diffusion of a grating at each end of the strip guide in this type of modulator can produce a cavity of the type required in the present invention. The application of an integrated optical photodetector in contact with a higher index medium covering a portion of the strip can serve as the source of potential to be coupled back to the electrodes of the Kaminow et al modulator. A suitable integrated photodetector is disclosed in the article entitled "Integrated Optical Photodetector" by D. B. Ostrowsky et al, *Applied Physics Letters*, Vol. 22, No. 9, May 1, 1973, pages 463–464.

What is claimed is:

1. An amplitude-sensitive interferometer device comprising an interferometer cavity having two ends one of which is arranged to receive a single frequency linearly polarized single mode of input optical energy having a changing amplitude and the other of which is arranged to provide output optical energy whose amplitude is related to the amplitude of said input optical energy by a predetermined relationship, an electro-optic medium having terminals and positioned within said cavity so as to interact with optical energy present in said cavity, and photodetector means responsive to the optical energy in said cavity for coupling a voltage to the terminals of said electro-optic medium whose magnitude is a function of the intensity of the optical energy in said cavity, said two ends of said cavity are positioned such that the predetermined transmission through said cavity with zero voltage across said terminals at said single frequency is substantially equal to the minimum transmission obtainable for said cavity, whereby said predetermined relationship between the input optical energy amplitude and output optical energy amplitude is a bistable one in that two different output energy amplitudes are possible over a range of input optical energy amplitudes.

2. An amplitude-sensitive interferometer device comprising an interferometer cavity having two ends one of which is arranged to receive a single frequency linearly polarized single mode of input optical energy having a changing amplitude and the other of which is arranged to provide output optical energy whose amplitude is related to the amplitude of said input optical energy by a predetermined relationship, an electro-optic medium having terminals and positioned within said cavity so as to interact with optical energy present in said cavity, and photodetector means responsive to the optical energy in said cavity for coupling a voltage to the terminals of said electro-optic medium whose magnitude is a function of the intensity of the optical energy in said cavity, said two ends of said cavity being positioned such that a predetermined loss occurs through said cavity at said frequency with zero voltage across said terminals, said photodetector means includes an amplitude means having sufficient gain so as to cause a phase shift in said interferometer cavity equal to a plural number of $\pi$ radians in response to the maximum amplitude of said input optical energy.

3. An amplitude-sensitive interferometer apparatus comprising a Fabry-Perot cavity having two parallel highly reflective surfaces one of which is arranged to receive a single frequency linearly polarized single mode of input optical energy having a changing amplitude and the other of which is arranged to provide output optical energy whose amplitude is related to the amplitude of said input optical energy by a predetermined relationship, an electro-optic medium having terminals and positioned within said cavity so as to interact with optical energy present in said cavity, said electro-optic medium substantially filling said cavity, beam splitter means positioned so as to deflect a portion of said output optical energy, and photodetector means responsive to the deflected optical energy from said beam splitter means for coupling a voltage to the terminals of said electro-optic medium whose magnitude is a function of the intensity of said output optical energy, said two reflective surfaces being positioned such that a predetermined transmission substantially equal to minimum transmission for said cavity occurs through said cavity at said frequency with zero voltage across said terminals, whereby said predetermined relationship betweenn the input optical energy amplitude and output optical energy amplitude is a bistable one in that at least two different output energy amplitudes are possible over a range of input optical energy amplitudes.

4. An amplitude-sensitive interferometer apparatus as defined in claim 3 wherein said photodetector means includes a solar cell having its output connected to an electronic amplifier.

5. An amplitude-sensitive interferometer apparatus as defined in claim 3 wherein said photodetector means includes an amplifier means having sufficient gain so as to cause a phase shift in said interferometer cavity equal to a plural number of $\pi$ radians in response to the maximum amplitude of said input optical energy.

6. Apparatus for amplifying an input modulated optical signal comprising an interferometer cavity having two ends, an electro-optic medium having terminals and positioned within said cavity so as to interact with optical energy in said cavity, a source of single frequency linearly polarized single mode of optical energy having its output radiation coupled to one of said two ends of said cavity, a photodetector means for developing an output voltage in response to radiation impinging on its photosensitive surface, means for coupling said output voltage to the terminals of said electro-optic medium, and means for coupling said input signal and some of said optical energy in said cavity to the photosensitive surface of said photodetector means, the ends of said cavity being adjusted such that the cavity presents a low transmission factor in response to zero voltage at said terminals of said electro-optic medium and presents a near maximum transmission factor for a small increase in said voltage, and the amplitude of output radiation from said source of single frequency linearly polarized single mode of optical energy is selected such that the cavity presents a low transmission factor when said input modulated optical signal has zero amplitude.

7. Apparatus as defined in claim 6 wherein said means for coupling said input signal and some of said optical energy in said cavity includes at least one beam splitter means.

* * * * *